United States Patent [19]

Silverberg

[11] 4,178,094
[45] Dec. 11, 1979

[54] BELT SUPPORT AND STEERING MODULE

[75] Inventor: Morton Silverberg, Rochester, N.Y.

[73] Assignee: Xerox Corporation, Stamford, Conn.

[21] Appl. No.: 939,158

[22] Filed: Sep. 1, 1978

[51] Int. Cl.² ............................................ G03G 15/00
[52] U.S. Cl. ...................................... 355/16; 74/241;
198/811; 198/843; 355/3 BE
[58] Field of Search ...................... 355/3 BE, 3 R, 16;
74/241; 198/811, 835, 840, 841, 843

[56] References Cited

U.S. PATENT DOCUMENTS

| | | | |
|---|---|---|---|
| 3,435,693 | 4/1969 | Wright et al. ..................... 355/16 X |
| 3,500,694 | 3/1970 | Jones et al. ....................... 355/16 X |
| 3,592,071 | 7/1971 | Steinke ................................... 74/241 |
| 3,643,791 | 2/1972 | Thornsbery ......................... 198/835 |
| 3,726,588 | 4/1973 | Moser ................................ 355/16 X |
| 3,818,391 | 6/1974 | Jordon et al. ..................... 355/3 BE |
| 3,823,614 | 7/1974 | Fava et al. ............................. 74/241 |
| 3,846,021 | 11/1974 | Vola ....................................... 355/16 |

OTHER PUBLICATIONS

*Research Disclosure*, "Web Tracking Apparatus", pp. 29-31, May '76.

*Primary Examiner*—R. L. Moses
*Attorney, Agent, or Firm*—J. J. Ralabate; C. A. Green; H. Fleischer

[57] ABSTRACT

An apparatus which prevents lateral movement of a belt moving in a pre-determined path. The apparatus includes a readily deformable surface which moves the belt in the pre-determined path and a support for preventing lateral movement. Strains induced in the belt by preventing the lateral movement thereof distort the deformable surface which, in turn, cause the belt to return to the pre-determined path.

16 Claims, 7 Drawing Figures

BELT SUPPORT AND STEERING MODULE

The foregoing abstract is neither intended to define the invention disclosed in the specification, nor is it intended to be limiting as to the scope of the invention in any way.

BACKGROUND OF THE INVENTION

This invention relates generally to an electrophotographic printing machine, and more particularly concerns an improved apparatus for supporting and maintaining the transverse alignment of a moving photoconductive belt.

In an electrophotographic printing machine, a portion of a photoconductive belt is charged to a substantially uniform potential so as to sensitize the surface thereof. The charged portion of the photoconductive belt is then exposed to a light image of an original document being reproduced. Exposure of the charged photoconductive surface selectively discharges the charge thereon in the irradiated areas. In this manner, an electrostatic latent image is recorded on the photoconductive surface which corresponds to the informational areas contained within the original document. After the electrostatic latent image is recorded on the photoconductive surface, the latent image is developed by bringing a developer mix into contact therewith. The developer mix comprises toner particles adhering triboelectrically to carrier granules. These toner particles are attracted from the carrier granules to the latent image forming a toner powder image thereon. The toner powder image is then transferred to a copy sheet. Finally, the copy sheet is heated to permanently affix the toner particles thereto in image configuration. This general approach was originally disclosed by Carlson in U.S. Pat. No. 2,297,691, and has been further amplified and described by many related patents in the art.

Lateral alignment of the photoconductive belt is necessary in order to ensure that the latent image passes through each processing station at essentially the same point. Thus, it is necessary to minimize or eliminate any lateral deviations of the photoconductive belt from the pre-determined path of movement. Ideally, the photoconductive belt is perfect and its velocity vector substantially normal to the longitudinal axis of a perfect drive roller. In actuality, the velocity vector of the moving belt is not normal to the longitudinal axis of the drive roller. This may be due to the belt being skewed relative to the longitudinal axis of the drive roller, or the roller being tilted relative to the belt. In either case, the longitudinal axis of the drive roller is not perpendicular to the velocity vector of the belt. Thus, the belt tends to move laterally resulting in belt skewing. In order to minimize lateral movement, the photoconductive belt must be controlled to regulate its lateral position. Existing methods of controlling the lateral movement of the photoconductive belt include various forms of crowned rollers, flanged rollers and electrical servo systems. Systems of this type, however, frequently produce high local stresses resulting in damage to the sensitive photoconductive belt.

Edge tracking of a belt requires that the lateral forces between the flanges and belt edge be able to change the angle of approach between the belt and the next successive roller. When rollers are employed to support a belt, the lateral friction between the belt and the various rollers makes a system of this type highly impractical unless large forces applied to the belt without it being deformed, i.e. the case for unusually thick belts. Thus, it is highly desirable to eliminate or reduce lateral friction. The problem of edge guiding is thus reduced to being able to overcome the frictional and elastic forces between the belt and drive roller.

Accordingly, it is a primary object of the present invention to improve lateral tracking of a photoconductive belt employed in an electrophotographic printing machine.

PRIOR ART STATEMENT

Various types of devices have hereinbefore been developed to improve the support and control of photoconductive belts. The following prior art appears to be relavant:

Vola—U.S. Pat. No. 3,846,021—Nov. 5, 1974

The pertinent portion of the foregoing prior art may be briefly summarized as follows:

Vola discloses a reproducing machine including a belt entrained, in the upper regions, about a pair of guide rollers and a driven roller. In the lower regions, the belt is guided by a roller and aligning means. The driven roller has a resilient sheath, for example an elastic rubber. The sheath engages the full width of the belt and is sufficiently soft to be depressed by tension in the belt. This elastic sheath contributes to the alignment of the belt. The belt is maintained in highly accurate alignment with only slight forces being required on the side edges when they make contact with the end guides. The pair of guide rollers may be stationary having very smooth surfaces. End flanges protrude radially beyond the surface of the semi-cylindrical plate of the aligning means. The distance between opposed flanges is only slightly greater than the width of belt 1.

It is believed that the scope of the present invention, as defined by the appended claims, is patentably distinguishable over the foregoing prior art.

SUMMARY OF THE INVENTION

Briefly stated, and in accordance with the present invention, there is provided an apparatus for controlling the lateral movement of belt arranged to move in a pre-determined path.

Pursuant to the features of the invention, the apparatus includes means for moving the belt in the pre-determined path. The moving means has a readily deformable surface in contact with the belt. Means are provided for supporting the belt and opposing lateral movement of the belt from the pre-determined path. The supporting means causes the belt to distort the surface of the moving means so that the belt returns to the pre-determined path. Means supply a pressurized fluid between the belt and support thereof to partially support the belt and reduce friction therebetween.

BRIEF DESCRIPTION OF THE DRAWINGS

Other objects and advantages of the present invention will become apparent upon reading the following detailed description and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
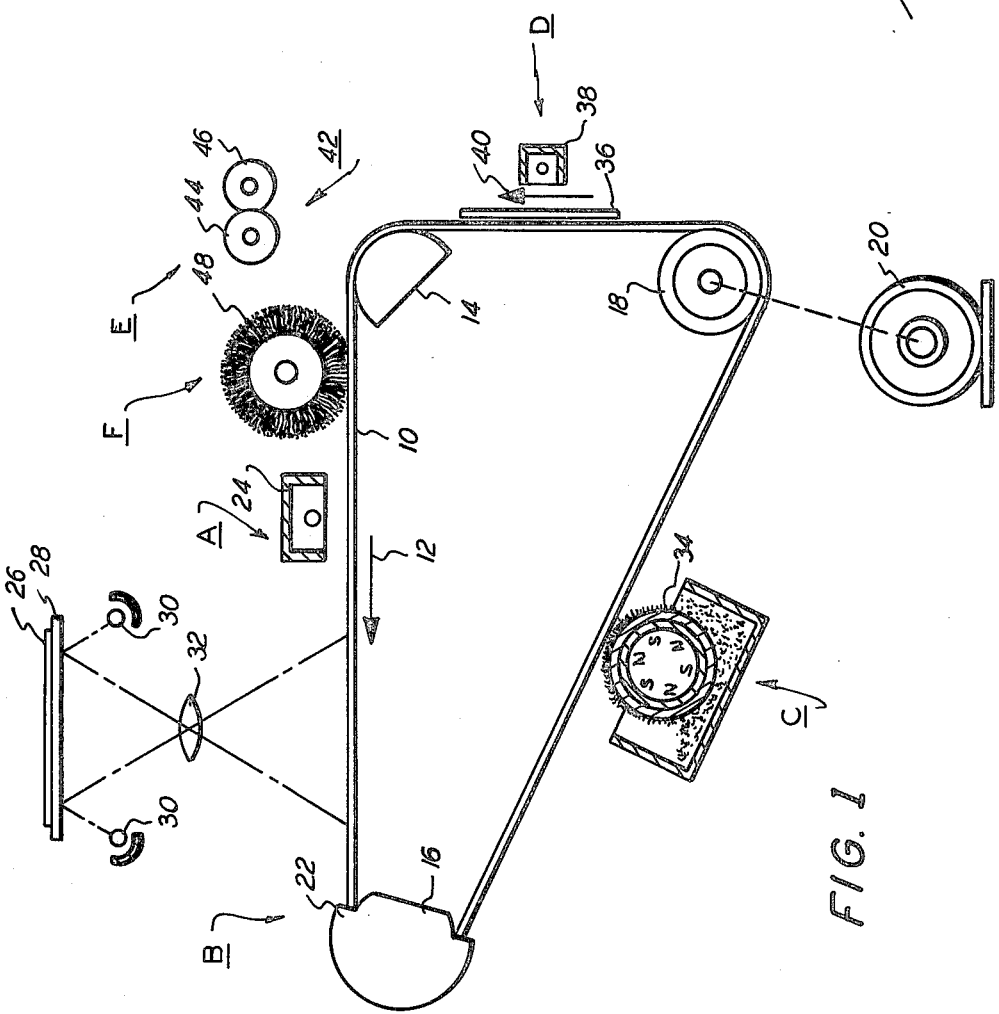
FIG. 1 is a schematic elevational view depicting an electrophotographic printing machine incorporating the features of the present invention therein.

For a general understanding of the illustrative electrophotographic printing machine incorporating the features of the present invention therein, reference is made to the drawings. In the drawings, like reference numerals have been used throughout to designate identical elements. FIG. 1 schematically depicts the various components of an electrophotographic printing machine employing the belt support and steering mechanism of the present invention therein. Although the belt steering and support mechanism is particularly well adapted for use in an electrophotographic printing machine, it will become evident from the following discussion that it is equally well suited for use in a wide variety of devices and is not necessarily limited in its application to the particular embodiment shown herein.

Inasmuch as the art of electrophotographic printing is well known, the various processing stations employed in the FIG. 1 printing machine will be shown hereinafter schematically, and their operation described briefly with reference thereto.

As shown in FIG. 1, the electrophotographic printing machine employs a belt 10 having a photoconductive surface deposited on a conductive substrate. Preferably, the photoconductive substrate is made from a selenium alloy with the conductive substrate being made from an aluminum alloy. Belt 10 moves in the direction of arrow 12 to advance sequentially through the processing stations disposed about the periphery thereof. As shown, belt 10 is disposed about post 14, steering post 16, and drive roller 18. Posts 14 and 16 may be mounted pivotably about one or two axis depending upon the embodiment described hereinafter. These embodiments will be discussed, in greater detail, with reference to FIGS. 2 through 4, inclusive. Drive roller 18 is rotated by motor 20 coupled thereto by a suitable means such as a belt. Post 16 has a pair of spaced end guides 22 arranged to maintain belt 10 in a pre-determined path of movement. A blower system is connected to posts 14 and 16. Both posts 14 and 16 have small holes in the circumferential surface thereof coupled to an interior chamber. The blower system furnishes presserized fluid, i.e. a compressible gas such as air, to the interior chamber. The fluid egresses from the interior chamber through the apertures and forms a fluid film between belt 10 and the respective post. In this manner, the fluid film at least partially supports the belt as it passes over the respective post diminishing friction therebetween. A common blower system is employed for posts 14 and 16. The details of the blower system and posts are described in FIGS. 6 and 7.

With continued reference to FIG. 1, initially a portion of belt 10 passes through charging station A. At charging station A, a corona generating device, indicated generally by the reference numeral 24, charges the photoconductive surface of belt 10 to a relatively high, substantially uniform potential. A suitable corona generating device is described in U.S. Pat. No. 2,836,725 issued to Vyverberg in 1958.

Next, the charged portion of the photoconductive surface of belt 10 is advanced through exposure station B. At exposure station B, an original document 26 is positioned face down upon transparent platen 28. Lamps 30 flash light rays onto the informational surface of original document 26. The light rays reflected from the original document pass through lens 32 forming a light image thereof. This light image is projected onto the charged portion of the photoconductive surface of belt 10. In this manner, the charged photoconductive surface is discharged selectively by the light image of the original document. This records an electrostatic latent image on the photoconductive surface of belt 10 which corresponds to the informational areas contained within original document 26.

Thereafter, belt 10 advances the electrostatic latent image recorded on the photoconductive surface to development station C. At development station C, a magnetic brush developer roller 34 advances a developer mix into contact with the electrostatic latent image recorded on the photoconductive surface of belt 10. The developer mix comprises carrier granules having toner particles adhering triboelectrically thereto. The magnetic brush developer roller forms a chainlike array of developer mix extending in an outwardly direction therefrom. The developer mix contacts the electrostatic latent image recorded on the photoconductive surface. The latent image attracts the toner particles from the carrier granules forming a toner powder image on the photoconductive surface of belt 10.

The toner powder image recorded on the photoconductive surface is then advanced by belt 10 to transfer station D. At transfer station D, a sheet of support material 36 is positioned in contact with the toner powder image deposited on the photoconductive surface. The sheet of support material 36 is advanced to the transfer station by a sheet feeding apparatus. Preferably, the sheet feeding apparatus includes a feed roll contacting the uppermost sheet of a stack of sheets of support material. The feed roll rotates so as to advance the uppermost sheet from the stack. Registration rollers align and forward the advancing sheet of support material into a chute. The chute directs the advancing sheet of support material into contact with the photoconductive surface of belt 10 in a timed sequence so that the powder image developed thereon contacts the advancing sheet of support material at transfer station D.

Transfer station D includes a corona generating device 38 which applies a spray of ions to the back side of sheet 36. This attracts the toner powder image from the photoconductive surface of belt 10 to sheet 36. After transfer, the sheet continues to move in the direction of arrow 40 and is separated from belt 10 by a detack corona generating device (not shown) neutralizing the charge causing sheet 36 to remain adhering to belt 10. A conveyor system (not shown) advances the sheet from belt 10 to fusing station E.

Fusing station E includes a fuser assembly, indicated generally by the reference numeral 42, which permanently affixes the transferred toner powder image to sheet 36. Preferably, fuser assembly 42 includes a heated fuser roll 44 and a backup roll 46. Sheet 36, having the toner powder image thereon, passes between fuser roll 44 and backup roll 46 with the toner powder image contacting fuser roll 44. In this manner, the toner powder image is permanently affixed to sheet 36. After fusing, a series of conveyors (not shown) advance sheet 36 to a catch tray (not shown) for subsequent removal from the printing machine by the operator.

Invariably, after the sheet of support material is separated from the photoconductive surface of belt 10, some residual particles remain adhering to belt 10. These particles are removed from belt 10 at cleaning station F. Cleaning station F includes a rotatably mounted fibrous brush 48 in contact with the photoconductive surface of belt 10. The particles are cleaned from the photoconductive surface by the rotation of brush 48 in contact therewith. Subsequent to cleaning, a discharge lamp (not shown) floods the photoconductive surface of belt 10 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the features of the present invention therein.

Figure 2:
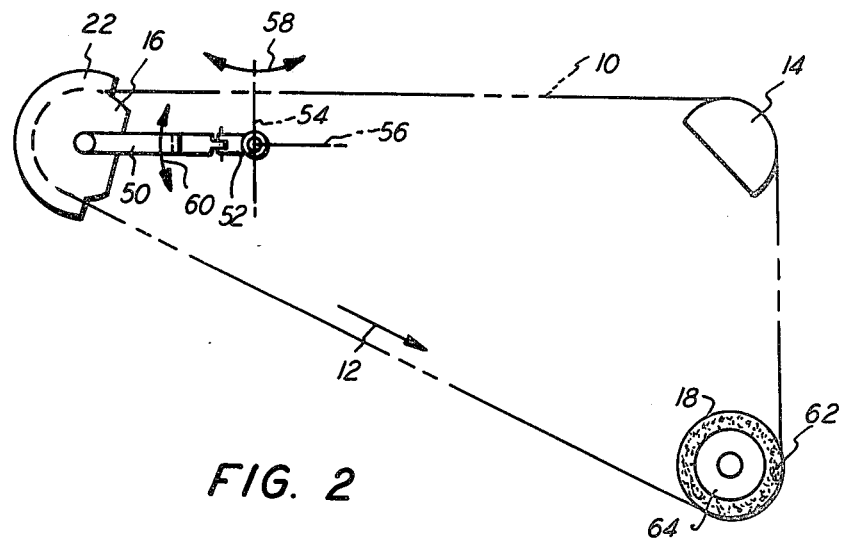
FIG. 2 is a schematic elevational view illustrating one embodiment of a belt module employed in the FIG. 1 printing machine.

Referring now to the specific subject matter of the present invention, FIG. 2 depicts one embodiment of the belt support and steering module in greater detail.

Turning now to FIG. 2, there is shown belt 10 entrained about a stationary post 14. Post 16 is mounted in a U-shaped member 50 having a rod 52 extending outwardly from the center of U-shaped member 50. Rod 52 is supported in a universal joint permitting post 16 to pivot about axis 54 and axis 56 in the direction of arrows 58 and 60, respectively. Thus, post 16 having end guides 22 secured to opposed side marginal regions thereof is supported for pivoting movement about axis 54 and about axis 56. Hence, post 16 is double pivoted. In this embodiment, drive roller 18 has a layer of readily deformable urethane 62, such as foam, secured to a substantially rigid cylinder 64, i.e. a metal cylinder. The purpose of the urethane layer 62 covering cylinder 64 is to permit the belt approaching and departing angles with respect to drive roller 18 to depart from a nominal position by compressing layer 62. Thus, the nonuniformities in the tension of belt 10 across its width generated by end guides 22, cause cylindrical drive roller 18 to be transformed into a conical section. The conical profile of drive roller 18 causes the belt to move laterally in a direction which relieves the edge forces between the belt and end guides 22. It is highly important that there be little or no lateral friction between belt 10 and post 16. Lateral friction induces a stiffening of the belt curvature in the edge guiding region. Thus, in operation, post 16 pivots about axis 58 due to the forces applied by end guides 22 on belt 10. Pivoting of post 16 about axis 56 provides for initial alignment which compensates for the belt nonuniformities.

Figure 3:
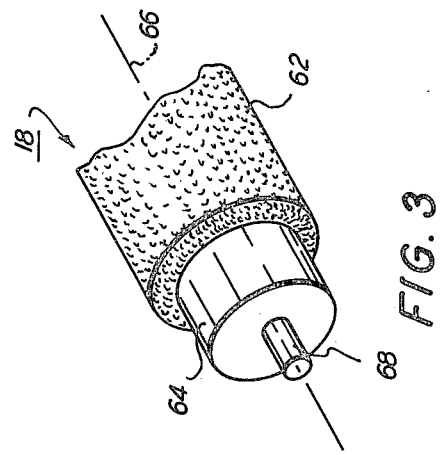
FIG. 3 is a schematic perspective view depicting the drive roller used in the FIG. 2 belt module.

Turning now to FIG. 3, there is shown drive roller 18 in greater detail. As depicted therein, drive roller 18 is journaled for rotational movement about axis 66, Shaft 68 is mounted in suitable bearings to permit roller 18 to rotate about axis 66. Shaft 68 is integral with metal cylinder 64. A layer of urethane 62, i.e. foam is secured via adhesives or an interference fit, preferably adhesives, to cylinder 64. This enables drive roller 18 to deform into a conical configuration permitting belt 10 to move laterally in a direction to offset the edge guide forces applied to belt 10 by end guides 22.

Figure 4:
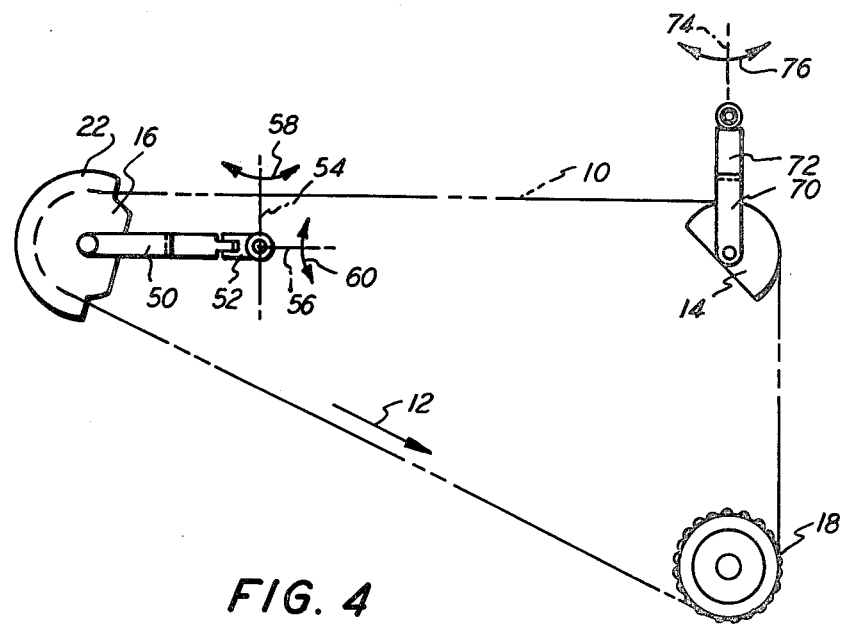
FIG. 4 is a schematic elevational view showing another embodiment of the belt module used in the FIG. 1 printing machine.

Referring now to FIG. 4, there is shown another embodiment of the belt support and steering module. As depicted thereat, post 14 is supported in a U-shaped member 70 having a rod 72 extending outwardly from the central portion of U-shaped member 70. Rod 72 is mounted in suitable bearings permitting post 14 to rotate about axis 74 in the direction of arrow 76. Post 16 is also mounted in a U-shaped member 50 having a rod 52 extending from the central portion thereof. Rod 52 is supported in a universal joint permitting post 16 to rotate about axis 54 in the direction of arrow 58. In addition, post 16 can rotate about axis 56 in the direction of arrow 60. Post 16 is rotated about axis 56 in the direction of arrow 60 to provide initial adjustments so as to compensate for the nonuniformities in belt 10. Drive roller 18 includes a metal cylinder having a elastomeric layer wrapped thereabout. Preferably, the elastomeric layer is made from a suitable rubber. A plurality of spaced protuberances or dimples extend outwardly from the elastomeric layer. In operation, post 16 pivots about axis 54 in the direction of arrow 58 as end guides 22 engage the edge portions of belt 10. This induces pivoting movement of post 14 about axis 74 in the direction of arrow 76. In addition, the forces generated by end guides 22 on belt 10 cause belt 10 to compress the protuberances extending outwardly from the elastomeric layer on drive roller 18 to generate a conical section. This conical profile causes belt 10 to move laterally in a direction which relieves the contact forces between the edge of belt 10 and end guides 22. The detailed structure of drive roller 18 is shown in FIG. 5.

Figure 5:
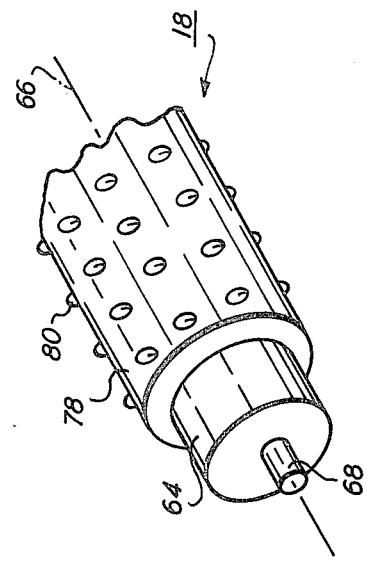
FIG. 5 is a schematic perspective view illustrating the drive roller used in the FIG. 4 belt module.

As shown in FIG. 5, drive roller 18 includes a shaft 68 integral with metal cylinder 64. Shaft 68 is mounted in suitable bearings permitting roller 18 to rotate about axis 66. Elastomeric layer 78 is wrapped about cylinder 64 and adhesively secured thereto or pressfit thereon. Preferably, layer 78 is adhesively secured to cylinder 64 with a suitable cement. Elastomeric layer 78 includes a plurality of protuberances or dimples 80 extending outwardly from the surface thereof. In this way, protuberances 80 flex or deform when in contact with belt 10 and return to their normal positions when spaced from the surface of belt 10.

Figure 6:
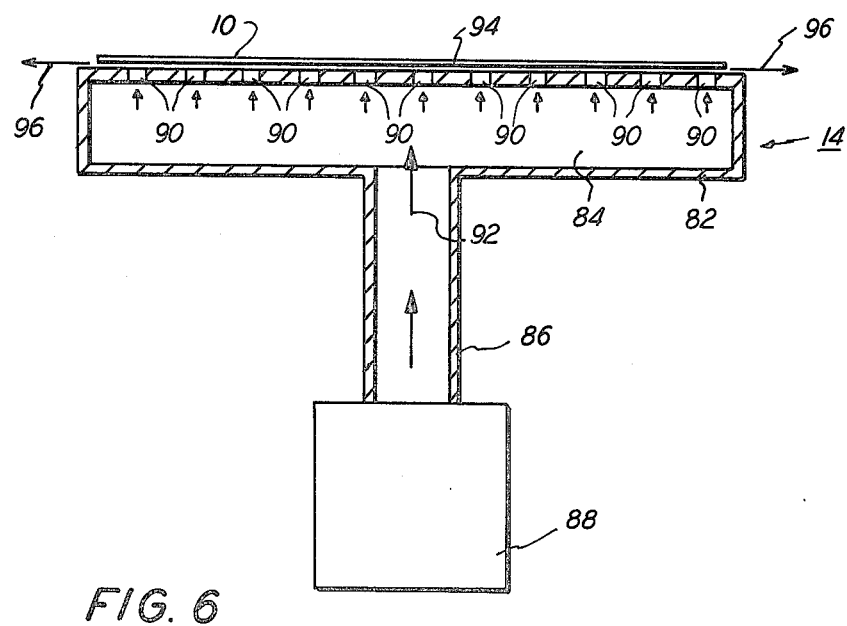
FIG. 6 is a schematic sectional elevational view of the pneumatic system associated with one support post.

The detailed structure of post 14 will now be described with reference to FIG. 6. Post 14 includes a substantially cylindrical tube 82 defining an interior chamber 84. Conduit 86 couples blower 88 with the interior chamber 84 of tube 82. Tube 82 has a plurality of apertures 90 or holes in the circumferential surface thereof. In this manner, pressurized air flows from blower 88 in the directiion of arrow 92 through conduit 86 into chamber 84 of tube 82. The pressurized air egresses from chamber 84 of tube 82 through holes 90. The pressurized air enters into gap 94 and moves outwardly therefrom in the direction of arrow 96. This produces a fluid film between belt 10 and post 14 providing substantially frictionless support thereof.

Figure 7:
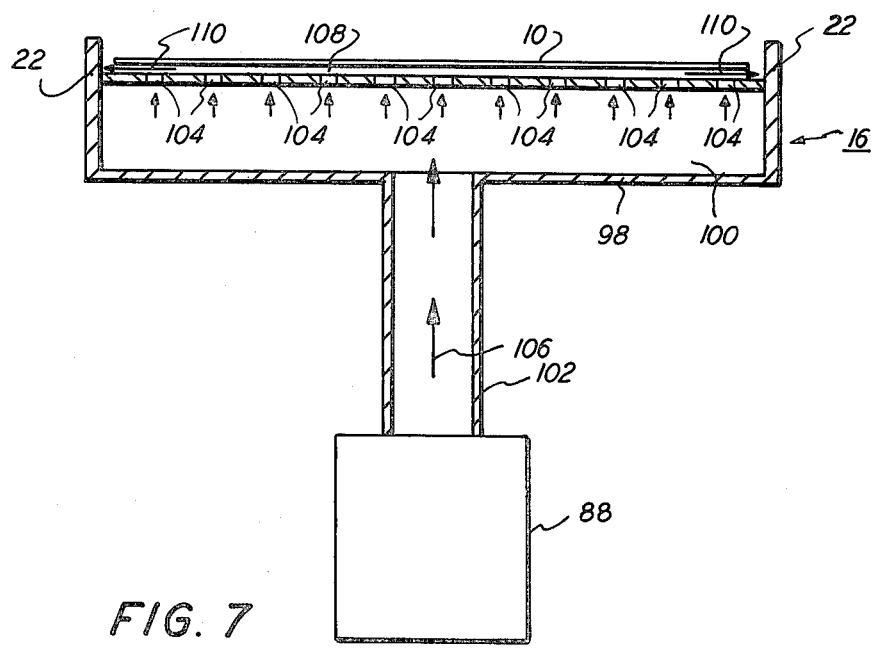
FIG. 7 is a schematic sectional elevational view of the pneumatic system associated with the other support post.

Referring now to FIG. 7, there is shown the detailed structure of post 16. As depicted thereat, post 16 comprises a substantially cylindrical tube 98 defining an interior chamber 100. Conduit 102 couples blower 88 with chamber 100. Tube 98 has a plurality of apertures 104 or holes in the circumferential surface thereof. End guides 22 are secured to tube 98 and are preferably arcuate extending about a portion of the periphery thereof. End guides 22 are positioned at opposed marginal regions of tube 98 at a distance slightly greater than the width of belt 10. In this way, any lateral movement of belt 10 is opposed by one of the end guides 22. End guides 22 define a passageway through which belt 10 moves. This passageway defines the pre-determined path of movement for belt 10. In operation, blower 88 produces a flow of compressed fluid, i.e. air which passes through conduit 102, in the direction of arrow 106, into chamber 100. The compressed air egresses from chamber 100 via holes 104 into gap 108 between belt 10 and the circumferential surface of tube 98. The compressed air moves in the direction of arrow 110 providing support for belt 10 as it passes over post 16. In this way, belt 10 is supported by a fluid film diminishing or entirely reducing friction between post 16 and belt 10 as it passes thereover.

In recapitulation, it is evident that the apparatus of the present invention provides support for a moving belt. This support prevents lateral movement of the belt from a pre-determined path. The belt is supported by a pair of posts at least one of which is mounted pivotably. The posts are spaced from the belt as it passes thereover by a film of compressed air. This significantly reduces the friction between the belt and the posts. End guides on one of the posts define a passageway through which the belt passes. The end guides define the pre-determined path of movement for the belt. Any lateral movement of the belt from the pre-determined path of movement is prevented by the end guides. As the end guides apply a force to the edges of the belt, the belt distorts a readily deformable layer on the drive roller. This deforms the drive roller into a conical profile. The conical profile of the drive roller causes the belt to move in a direction so as to return to the pre-determined path of movement eliminating the forces between the end guides and the edges of the belt. The response time of the system is rapid and the edge forces applied to the belt are minimal due to the low friction between the posts and the belt passing thereover.

It is, therefore, evident that there has been provided in accordance with the present invention, an apparatus for supporting and steering a photoconductive belt that fully satisfies the objects, aims and advantages hereinbefore set forth. While this invention has been described in conjunction with specific embodiments thereof, it is evident that many alternatives, modifications and variations will be apparent to those skilled in the art. Accordingly, it is intended to embrace all such alternatives, modifications and variations as fall within the spirit and broad scope of the appended claims.

What is claimed is:

1. An apparatus for controlling the lateral movement of a belt arranged to move in a pre-determined path, including:
    means for moving the belt in the pre-determined path, said moving means having a readily deformable surface in contact with the belt;
    means for supporting the belt and opposing the lateral movement of the belt from the pre-determined path, said supporting means causing the belt to distort the surface of said moving means so that the belt returns to the pre-determined path; and
    means for supplying a pressurized fluid between said supporting means and the belt to at least partially support the belt and reduce friction between the belt and said supporting means.

2. An apparatus as recited in claim 1, wherein said supporting means includes:
    a first post defining an interior chamber in communication with said supplying means and having a plurality of apertures in the periphery thereof through which pressurized fluid flows to form a fluid film between said first post and the portion of the belt passing thereover; and
    a second post spaced from said first post, said second post defining an interior chamber in communication with said supplying means and having a plurality of apertures in the periphery thereof through which pressurized fluid flows to form a fluid film between said second post and the portion of the belt passing thereover.

3. An apparatus as recited in claim 2, wherein said moving means includes:
    a drive roller having a layer of readily formable material in contact with the belt; and
    means for rotating said drive roller to move the belt in the pre-determined path.

4. An apparatus as recited in claim 3, wherein said first post is pivotably mounted and said second post is substantially fixed.

5. An apparatus as recited in claim 4, wherein the layer of readily deformable material of said drive roller includes urethane.

6. An apparatus as recited in claim 3, wherein said first post is pivotably mounted and second post is pivotably mounted.

7. An apparatus as recited in claim 6, wherein the layer of readily deformable material of said drive roller includes an elastomeric layer having a plurality of protuberences extending outwardly therefrom.

8. An apparatus as recited in claim 3, wherein said first post includes a pair of opposed, spaced end guides, one of said pair of end guides being secured to one marginal end of said first post and the other said pair of end guides being secured to the other marginal end of said first post, said pair of end guides extending in a direction substantially normal to the longitudinal axis of said first post and being spaced from one another a distance sufficient to define a passageway through which the belt moves.

9. An electrophotographic printing machine of the type having an endless photoconductive belt moving in a predetermined path through a plurality of processing stations disposed thereabout, wherein the improvement includes:
    means for moving the belt in a pre-determined path, said moving means having a readily deformable surface in contact with the belt;
    means for supporting the belt and opposing the lateral movement of the belt from the pre-determined path, said supporting means causing the belt to distort the surface of said moving means so that the belt returns to the pre-determined path; and
    means for supplying a pressurized fluid between said supporting means and the belt to at least partially support the belt and reduce friction between the belt and said supporting means.

10. A printing machine as recited in claim 9, wherein said supporting means includes:

a first post defining an interior chamber in communication with said supplying means and having a plurality of apertures in the periphery thereof through which pressurized fluid flows to form a fluid film between said first post and the portion of the belt passing thereover; and a second post spaced from said first post, said second post defining an interior chamber in communication with said supplying means and having a plurality of apertures in the periphery thereof through which pressurized fluid flows to form a fluid film between said second post and the portion of the belt passing thereover.

11. A printing machine as recited in claim 10, wherein said moving means includes:

a drive roller having a layer of readily deformable material in contact with the belt; and means for rotating said drive roller to move the belt in the pre-determined path.

12. A printing machine as recited in claim 11, wherein said first post is pivotably mounted and said second post is substantially fixed.

13. A printing machine as recited in claim 12, wherein the layer of readily deformable material of said drive roller includes urethane.

14. A printing machine as recited in claim 11, wherein said first post is pivotably mounted and said second post is pivotably mounted.

15. A printing machine as recited in claim 14, wherein the layer of readily deformable material of said drive roller includes an elastomeric layer having a plurality of protuberences extending outwardly therefrom.

16. A printing machine as recited in claim 11, wherein said first post includes a pair of opposed, spaced end guides, one of said pair of end guides being secured to one marginal end of said first post and the other of said pair of end guides being secured to the other marginal end of said first post, said pair of end guides extending in a direction substantially normal to the longitudinal axis of said first post and being spaced from one another a distance sufficient to define a passageway through which the belt moves.

* * * * *